United States Patent [19]

Squirrell

[11] 4,298,235
[45] Nov. 3, 1981

[54] BEARING SYSTEM FOR ISOLATORS

[75] Inventor: Anton F. Squirrell, Samstagern, Switzerland

[73] Assignee: Grovag Grossventiltechnik A.G., Glarus, Switzerland

[21] Appl. No.: 81,343

[22] Filed: Oct. 3, 1979

[30] Foreign Application Priority Data

Oct. 9, 1978 [GB] United Kingdom .............. 39826/78

[51] Int. Cl.³ ............................................. F16C 27/02
[52] U.S. Cl. ...................................... 308/26; 308/28; 308/36.1; 308/DIG. 8
[58] Field of Search ...................... 308/26, 27, 28, 30, 308/36.1, 237 R, 237 A, DIG. 8

[56] References Cited

U.S. PATENT DOCUMENTS 3,113,809 12/1963 Eggmann .......................... 308/28 X
3,981,132 9/1976 Miyazki et al. ................... 308/26 X Primary Examiner—Frederick R. Schmidt
Attorney, Agent, or Firm—St. Onge, Steward, Johnston, Reens & Noe

[57] ABSTRACT

A bearing system fitted around a shaft of an isolator, comprising a shaft seal fitted around the shaft, the shaft seal comprising at least one flexible annular metal disc attached to the isolator frame, and a bearing fitted around the shaft at a location spaced from the shaft seal, the bearing comprising at least three individually removable bearing segments secured to a bearing mounting by means of at least one flexible annular diaphragm.

10 Claims, 3 Drawing Figures

U.S. Patent
Nov. 3, 1981
4,298,235
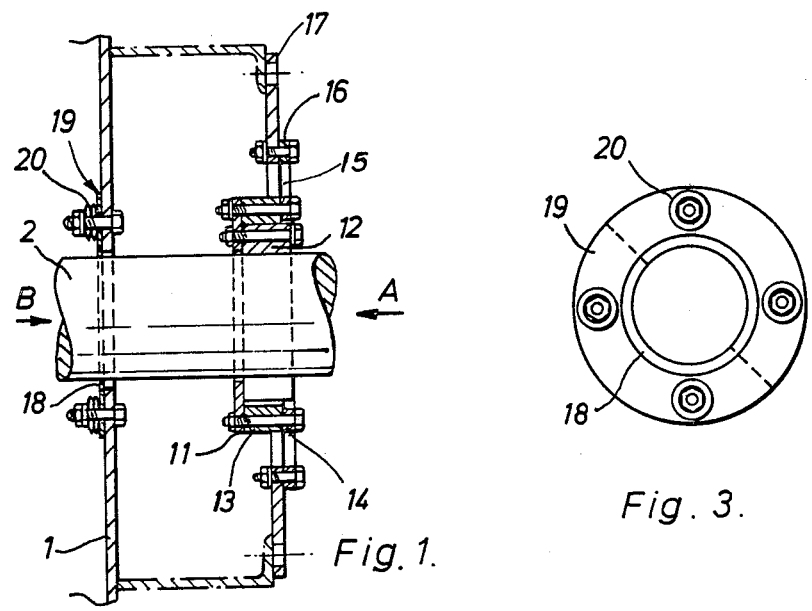
Fig. 1.
Fig. 3.
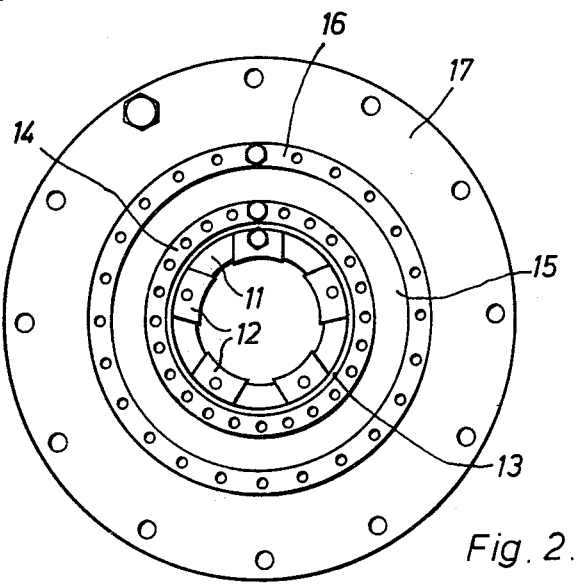
Fig. 2.

BEARING SYSTEM FOR ISOLATORS

This invention relates to a bearing system for isolators.

The problem of providing suitable bearings and shaft seals for the blade axles of isolators in the form of isolation and control valves and dampers, requiring a 90 degree rotary motion, is accentuated by the unusual conditions in which they have to function. These include slow operational speeds, infrequent operation, minimal maintenance and lubrication. Further the bearings and seals must be capable of operating in dusty and/or corrosive environments while being subjected to conduction along the blade axle and from mounting brackets and to radiation from the isolator frame.

Hitherto no bearing has been disigned to cope specifically with these conditions. In practice one of the following types of bearings has been used:
1—Rolling contact bearings;
2—Proprietary bearings, using special materials requiring no lubrication;
3—Cast iron journal bearings;
4—Bearings incorporated in the shaft seal.

All of these suffer from various disadvantages when used in operating conditions as severe as those previously stated. Not least of these is the detrimental effect which most current forms of shaft seal have on bearing performance. Considering each of the specific types in turn:

1—The rolling contact bearings normally fitted are single row ball bearings mounted in a pillow block or flanged pressed steel or cast iron housing. These have an outer race with a spherical outer surface which fits into a matching spherical bore in the housing to give a self-aligning capability. Alternatively spherical roller bearings are used where the outer race has a spherical bore and the spherical profile of the two rows of rollers gives the self-aligning feature.

To prevent the ingress of particulates into the bearing, seals are sometimes fitted. However, these are generally inadequate and as a result the bearing seizes up. This problem is accentuated by the onset of corrosion of the balls or rollers and raceways and loss of the self-aligning capability unless there is frequent lubrication, especially where heat transmission along the blade axle causes the lubricant to run out of the bearings.

In the simplest applications the shaft seal is provided by mounting the bearings directly onto the damper frame. However, temperature effects are magnified and when the bearing seal fails the shaft sealing effectiveness is lost. Alternatively a conventional stuffing box is used. This has the immediate disadvantage in that it inhibits the self-aligning capability of the bearings, of whichever type. Further these shaft seals need regular maintenance. The glands need to be tightened up periodically to maintain a seal. The packing material will suffer from wear because of the radial loads subjected to it and can also shrink and harden when exposed to temperature, necessitating repacking of the stuffing box.

2—Proprietary bearings requiring no lubrication use materials such as nylon, bronze with graphite inserts, P.T.F.E., carbon, sintered bronze or iron with a solid lubricant.

They are usually plain journal bearings mounted in a housing with spherical surfaces to give a self-aligning capability. They are prone to seizure, due to ingress of particulates, and because of the soft nature of the bearing materials excessive wear can only be avoided by maintaining a high surface finish on the shaft. This is not possible in the conditions indicated, since deposits will collect on the surfaces and corrosion will occur causing pitting or the accumulation of corrosion products. Further the allowable loads per unit projected area are low, while the sintered type are incapable of taking shock loads.

Shaft seals used with this type of bearing are generally the stuffing box and gland, described above, with the same inherent disadvantages.

3—Plain cast iron journal bearings have no self-aligning capability and there is no means of preventing the ingress of particulates which may cause them to seize up. When mounted directly on the damper frame to form the shaft seal heat conduction may cause seizure unless the bearing clearances are generous, in which case leakage of gas will occur.

4—Some dampers use bearings, in the form of an insert, incorporated in the stuffing box shaft seal system. These, having no self-aligning capability, cause excessive wear of the stuffing box packing and are liable to seize up due to particulate ingress.

There is therefore a need for a bearing and shaft seal system which:
(a) has no lubrication requirement;
(b) has a self-aligning capability;
(c) is not affected by particulates in the environment;
(d) is not affected by temperature; and
(e) where the shaft seal does not inhibit the self-aligning properties of the bearing.

The present invention provides a bearing system fitted around a shaft of an isolator, comprising a shaft seal fitted around the shaft, the shaft seal comprising at least one flexible annular metal disc attached to the isolator frame, and a bearing fitted around the shaft at a location spaced from the shaft seal, the bearing comprising at least three individually removable bearing segments secured to a bearing mounting by means of at least one flexible annular diaphragm.

The bearing of the bearing system according to the invention, which bearing preferably has five bearing segments made of phosphor bronze or gun metal, is self-aligning by virtue of being connected to the bearing mounting preferably by means of two superimposed flexible diaphragms which are preferably made of stainless steel. The large free surface in combination with the small volume of this diaphragm assembly, and the low temperature conductivity of the material of which it is made, make the diaphragm assembly a temperature barrier between the bearing and the bearing mounting.

The shaft seal of the bearing system preferably comprises two superimposed split flexible stainless steel discs pressed against the shaft and isolator frame by a metal clamping, giving a positive metal-to-metal seal between the shaft and the isolator frame.

The invention will be further described, by way of example only, with reference to the accompanying drawings, in which:

FIG. 1 is a cross-sectional view of a bearing system according to the invention fitted on a shaft of an isolator;

FIG. 2 is a view taken in the direction of the arrow A in FIG. 1; and FIG. 3 is a view taken in the direction of the arrow B in FIG. 1.

The drawings show a main frame 1 of an isolator, through which frame extends a stainless steel shaft 2. Mounted around the shaft 2 are a bearing and a shaft seal, which together constitute a bearing system.

The bearing comprises, radially outwardly from the shaft, a concentric ring made up of two parts, namely a flat disc 11, to which five bearing segments 12 are bolted, and a retaining ring 13, which takes the radial load of the bearing. The bolts securing the segments 12 do not themselves transmit the radial load. The segments 12 and ring 13 are toleranced to give generous clearance between the shaft and the segments. This is acceptable because of the low rotational speeds involved and eliminates any danger of the bearing seizing on the shaft. Interruptions in the shaft bearing contact surface are created by having gaps between the segments so that the bearing surface does not normally exceed about 70% of the swept surface of the shaft. This allows any build up of particulates to be easily sheared through by the applied operating torque and provides an escape for the particulates. In addition the sides of the segments are shaped to provide a cleaning action to the shaft. The use of segments enables bearing sections to be individually replaced without having to dismantle the whole bearing assembly.

Two superimposed annular flexible metallic diaphragms 15 are clamped to the retaining ring 13 by means of a clamping ring 14. These diaphragms 15 in turn are clamped by a larger ring 16 at their outer edges to a bearing mounting plate 17. The two diaphragms 15 are arranged with their coil stock rolling directions at 90 degrees to each other so that the mechanical properties of the diaphragm assembly are symmetrical around 360 degrees. The two diaphragms 15, by allowing the central bearing system to deflect angularly, provide the self-aligning capability.

The shaft seal, mounted on the isolator frame, consists of two superimposed split annular flexible metallic sealing discs 18. To eliminate leakage past the radial joint the splits in the respective discs 18 are arranged at 180 degrees to each other, as shown in FIG. 3. The discs 18 are held against the isolator frame by a clamping ring 19 with four belleville washer stacks 20. The discs 18 are sandwiched between two discs of similar material (not shown in the drawings) which reduce the coefficient of friction between the sealing discs 18 and the isolator frame 1 or clamping ring 19, thus promoting an easy floating action of the sealing discs.

The washer stacks 20 impose a controlled clamping force enabling the discs 18 to float in the plane of the isolator frame 1 and thereby accomodate the shaft movement at that point when the bearing has deflected to take up some shaft misalignment or distortion. Thus this design of the shaft seal does not inhibit the self-alignment capabilities of the bearing. In addition this shaft seal has the advantage that the sealing discs 18 may be replaced without dismounting the bearing.

The disc 11, the retaining ring 13, the clamping rings 14 and 16, and the mounting plate 17 are preferably of mild steel, the clamping ring 19 is preferably made of the same type of material, usually steel, as the isolator frame, the bearing segments 12 are preferably of phosphor bronze or gun metal, and the diaphragm 15 and the discs 18 are preferably of stainless steel.

I claim:

1. A bearing system fitted around a shaft of an isolator, comprising a shaft seal fitted around the shaft, the shaft seal comprising at least one flexible annular metal disc attached to the isolator frame, and a bearing fitted around the shaft at a location spaced from the shaft seal, the bearing comprising at least three individually removable bearing segments secured to a bearing mounting by means of at least one flexible annular diaphragm.

2. The bearing system according to claim 1, further comprising a clamping ring for securing said bearing segments to the inner edge of said at least one flexible diaphragm, and another clamping ring for securing the outer edge of the flexible diaphragm(s) to a bearing mounting plate secured to the isolator frame.

3. The bearing system according to claim 1, comprising five said bearing segments each bolted to a flat annular disc.

4. The bearing system according to claim 1, wherein said bearing segments are made of phosphor bronze.

5. The bearing system according to claim 1, wherein said bearing segments are made of gun metal.

6. The bearing system according to claim 1, comprising two said flexible diaphragms superimposed on each other.

7. The bearing system according to claim 1, wherein said at least one flexible diaphragm is made of stainless steel.

8. The bearing system according to claim 1, wherein the shaft seal comprises two superimposed split flixible annular metal discs, and a clamping frame holding said split discs against the isolator frame.

9. The bearing system according to claim 8, wherein the splits in the respective said discs are arranged at 180° to each other.

10. The bearing system according to claim 1, wherein said at least one disc of the shaft seal is made of stainless steel.

* * * * *